(12) United States Patent
Park et al.

(10) Patent No.: US 12,469,571 B2
(45) Date of Patent: Nov. 11, 2025

(54) METHOD OF OPERATING A CONTROLLER AND A MEMORY DEVICE RELATED TO RECOVERING DATA

(71) Applicant: SK hynix Inc., Icheon-si (KR)

(72) Inventors: Tae Hun Park, Icheon-si (KR); Dong Hun Kwak, Icheon-si (KR); Hyun Seob Shin, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 218 days.

(21) Appl. No.: 18/327,759

(22) Filed: Jun. 1, 2023

(65) Prior Publication Data

US 2024/0185933 A1 Jun. 6, 2024

(30) Foreign Application Priority Data

Dec. 6, 2022 (KR) .................. 10-2022-0168828

(51) Int. Cl.
*G11C 16/14* (2006.01)
*G11C 16/26* (2006.01)
*G11C 16/34* (2006.01)
*G11C 29/52* (2006.01)

(52) U.S. Cl.
CPC .......... *G11C 16/3459* (2013.01); *G11C 16/14* (2013.01); *G11C 16/26* (2013.01); *G11C 29/52* (2013.01)

(58) Field of Classification Search
CPC ..... G11C 16/3459; G11C 16/14; G11C 16/26; G11C 29/52; G11C 16/0483; G11C 29/025; G11C 16/08; G11C 29/42; G06F 3/0658; G06F 3/0659; G06F 3/0679; G06F 11/1048
USPC ...................................... 365/185.09
See application file for complete search history.

(56) References Cited

U.S. PATENT DOCUMENTS

| | | | |
|---|---|---|---|
| 2020/0174699 A1* | 6/2020 | Cho | G06F 3/0673 |
| 2022/0066870 A1* | 3/2022 | Choi | G06F 3/0653 |
| 2022/0122670 A1* | 4/2022 | Hwang | G11C 7/1063 |

FOREIGN PATENT DOCUMENTS

| | | | | |
|---|---|---|---|---|
| CN | 108664409 A | * | 10/2018 | ......... G06F 11/1004 |
| KR | 1020170030863 A | | 3/2017 | |
| KR | 1020180051341 A | | 5/2018 | |

* cited by examiner

*Primary Examiner* — Amir Zarabian
*Assistant Examiner* — Minh Dinh
(74) *Attorney, Agent, or Firm* — WILLIAM PARK AND ASSOCIATES LTD.

(57) ABSTRACT

A method of operating a controller includes transmitting a program command to a memory device, receiving a message indicating that a program operation corresponding to the program command is failed from the memory device, and transmitting an erase command for performing an erase operation on a page corresponding to the program command to the memory device in response to the message.

14 Claims, 12 Drawing Sheets

FIG. 6

| WL no. | DATA | |
| --- | --- | --- |
| | 1st PAGE | 2nd PAGE |
| WLn | D1n | D2n |
| WL(n-1) | D1(n-1) | D2(n-1) |
| ... | ... | ... |
| WL(i+1) | D1(i+1) | D2(i+1) |
| WLi | D1i | D2i |
| WL(i-1) | D1(i-1) | D2(i-1) |
| ... | ... | ... |
| WL1 | D11 | D21 |

METHOD OF OPERATING A CONTROLLER AND A MEMORY DEVICE RELATED TO RECOVERING DATA

CROSS-REFERENCE TO RELATED APPLICATION

The present application claims priority under 35 U.S.C. § 119(a) to Korean patent application number 10-2022-0168828 filed on Dec. 6, 2022, in the Korean Intellectual Property Office, the entire disclosure of which is incorporated by reference herein.

BACKGROUND

1. Technical Field

The present disclosure relates to an electronic device, and more particularly, to a method of operating a controller and a memory device related to recovering data.

2. Related Art

A semiconductor memory device may be formed in a two-dimensional structure in which strings are horizontally arranged on a semiconductor substrate, or may be formed in a three-dimensional structure in which the strings are vertically stacked on the semiconductor substrate. A three-dimensional memory device may include a plurality of memory cells that are stacked in a vertical direction on a semiconductor substrate.

A controller transmits a program command to the semiconductor memory device together with data to be programmed to the semiconductor memory device. When a program operation of the semiconductor memory device is completed, the controller may delete the transmitted data from a buffer memory. Therefore, when a defect occurs in a word line connected to a page to which data is programmed, after the program operation of the semiconductor memory device is completed, corresponding data is required to be recovered.

SUMMARY

According to an embodiment of the present disclosure, a method of operating a controller includes transmitting a program command to a memory device, receiving a message indicating that a program operation corresponding to the program command is failed from the memory device, and transmitting an erase command for performing an erase operation on a page corresponding to the program command to the memory device in response to the message.

According to an embodiment of the present disclosure, a method of operating a memory device includes receiving a read command from a controller, determining whether the read command is a recovery read command, and applying a read voltage to a plurality of word lines selected by the recovery read command and applying a pass voltage to unselected word lines, in response to determination that the read command is the recovery read command.

BRIEF DESCRIPTION OF THE DRAWINGS

FIG. 6 is a table illustrating data maintained in a buffer memory of a controller according to a program progression situation of FIG. 5.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

An embodiment of the present disclosure provides a method of operating a controller and a memory device related to recovering programmed data when a word line defect occurs.

In an embodiment, the method may further include transmitting a recovery read command for reading data of a page adjacent to a page corresponding to the program command to a memory device.

In an embodiment, the recovery read command may include row addresses specifying a first word line connected to the page corresponding to the program command and a second word line connected to the adjacent page.

In an embodiment, the method may further include performing a program operation, determining a failure of the program operation, and transmitting a message indicating that the program operation is failed to the controller, before receiving the read command.

In an embodiment, the method may further include receiving an erase command for partially erasing a page where the program operation is failed, and performing an erase operation on the page where the program operation is failed, in response to the erase command, after transmitting the message indicating that the program operation is failed to the controller.

An embodiment of the present technology may provide a method of operating a controller and a memory device related to recovering programmed data when a word line defect occurs.

Figure 1:
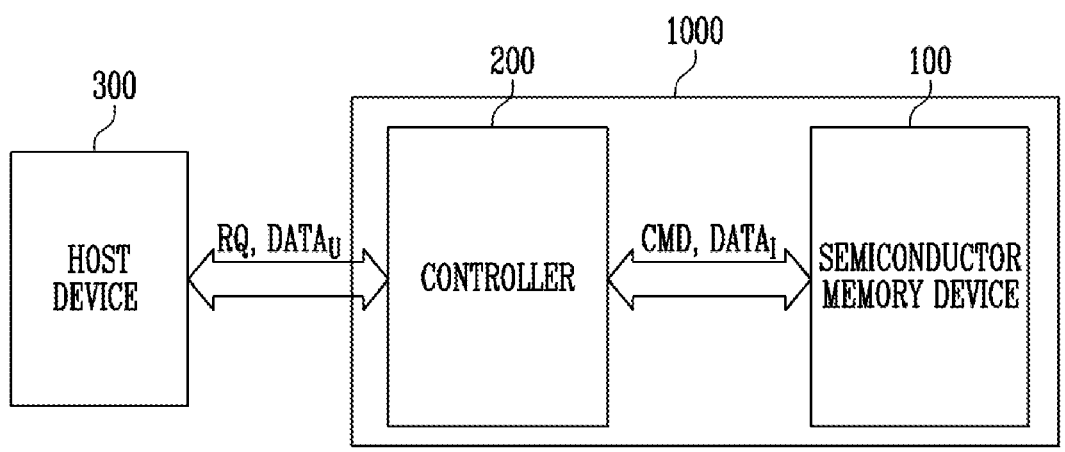
FIG. 1 is a block diagram illustrating a storage device including a semiconductor memory device and a controller according to an embodiment.

FIG. 1 is a block diagram illustrating a storage device including a semiconductor memory device and a controller according to an embodiment.

Referring to FIG. 1, the storage device 1000 includes the semiconductor memory device 100 and the controller 200. In addition, the storage device 1000 communicates with a host device 300. The controller 200 controls an operation of the semiconductor memory device 100 based on an operation request received from the host device 300.

The semiconductor memory device 100 operates in response to a command CMD of the controller 200. The semiconductor memory device 100 includes a memory cell array having a plurality of memory blocks. As an embodiment, the semiconductor memory device 100 may be a flash memory device.

The controller 200 may exchange data $DATA_U$ based on a request RQ from the host device 300. The data $DATA_U$ exchanged between the controller 200 and the host device 300 may be user data.

Specifically, the controller 200 may receive a write request, a read request, a trim request, or the like of the host device 300, and control the semiconductor memory device 100 based on the received requests. More specifically, the controller 200 may generate the commands CMD for controlling the operation of the semiconductor memory device 100 and transmit the commands CMD to the semiconductor memory device 100. Meanwhile, the controller 200 may exchange data $DATA_I$ with the semiconductor memory device 100. The data $DATA_I$ exchanged between the controller 200 and the semiconductor memory device 100 may be internal data.

The semiconductor memory device 100 is configured to receive the command CMD and an address from the controller 200 and access an area selected by the address in the memory cell array. That is, the semiconductor memory device 100 performs an internal operation corresponding to the command on the area selected by the address.

For example, the semiconductor memory device 100 may perform a program operation, a read operation, and an erase operation. During the program operation, the semiconductor memory device 100 may program data in the area selected by the address. During the read operation, the semiconductor memory device 100 may read data from the area selected by the address. During the erase operation, the semiconductor memory device 100 may erase data stored in the area selected by the address.

The storage device 1000 according to an embodiment of the present disclosure may recover data that is already programmed to the semiconductor memory device 100 and deleted from a buffer memory of the controller 200, in response to a word line defect that may occur when a program of the semiconductor memory device 100 has failed.

Figure 2:
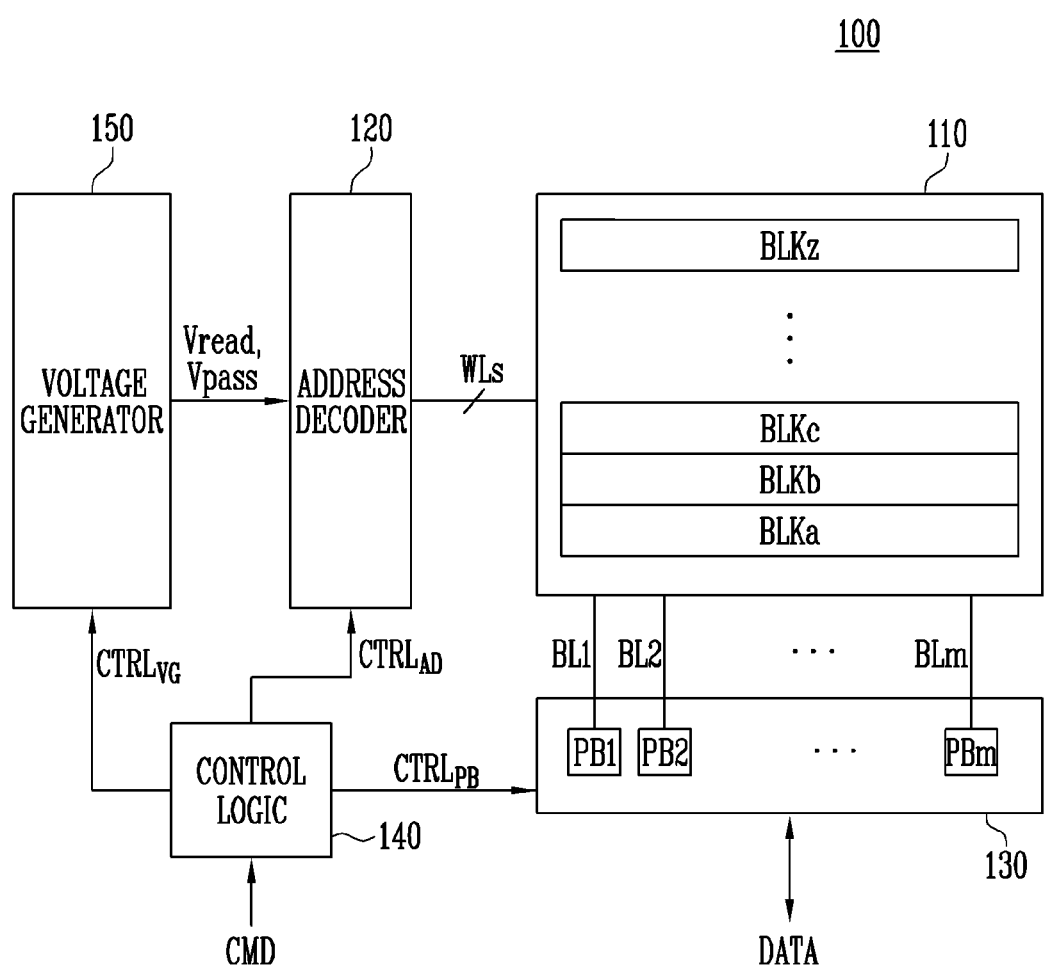
FIG. 2 is a block diagram illustrating a semiconductor memory device according to an embodiment of the present disclosure.

FIG. 2 is a block diagram illustrating a semiconductor memory device according to an embodiment of the present disclosure.

Referring to FIG. 2, the semiconductor memory device 100 includes a memory cell array 110, an address decoder 120, a read and write circuit 130, control logic 140 and a voltage generator 150. The control logic 140 may be implemented as hardware, software, or a combination of hardware and software. For example, the control logic 140 may be a control logic circuit operating in accordance with an algorithm and/or a processor executing control logic code.

The memory cell array 110 includes a plurality of memory blocks BLKa to BLKz. The plurality of memory blocks BLKa to BLKz are connected to the address decoder 120 through word lines WLs. The plurality of memory blocks BLKa to BLKz are connected to the read and write circuit 130 through bit lines BL1 to BLm. Each of the plurality of memory blocks BLKa to BLKz includes a plurality of memory cells. As an embodiment, the plurality of memory cells may be nonvolatile memory cells, and may be configured as nonvolatile memory cells having a vertical channel structure.

The address decoder 120, the read and write circuit 130, and the voltage generator 150 operate as a peripheral circuit that drives the memory cell array 110. The peripheral circuit may perform a read operation, a write operation, and an erase operation on the memory cell array 110, based on control of the control logic 140. The address decoder 120 is connected to the memory cell array 110 through the word lines WLs. The address decoder 120 is configured to operate in response to the control of the control logic 140. Specifically, the control logic 140 transmits an address decoding control signal $CTRL_{AD}$ to the address decoder 120, and the address decoder 120 performs a decoding operation based on the address decoding control signal $CTRL_{AD}$.

In addition, during the program operation, the address decoder 120 applies a program voltage generated by the voltage generator 150 to a selected word line and applies a program pass voltage to remaining unselected word lines. In addition, during a program verify operation, the address decoder 120 applies a verify voltage generated by the voltage generator 150 to the selected word line and applies a verify pass voltage to the remaining unselected word lines.

Meanwhile, during the read operation, the address decoder 120 applies a read voltage Vread generated by the voltage generator 150 to the selected word line and applies a pass voltage Vpass to the remaining unselected word lines.

The read and write circuit 130 includes a plurality of page buffers PB1 to PBm. The read and write circuit 130 may operate as a "read circuit" during the read operation of the memory cell array 110 and may operate as a "write circuit" during the write operation of the memory cell array 110. The plurality of page buffers PB1 to PBm are connected to the memory cell array 110 through the bit lines BL1 to BLm. The read and write circuit 130 performs the program operation on received data DATA in response to a page buffer control signal $CTRL_{PB}$ output from the control logic 140.

The control logic 140 is connected to the address decoder 120, the read and write circuit 130, and the voltage generator 150. The control logic 140 may receive the command CMD from an outside. The control logic 140 may control the address decoder 120, the read and write circuit 130, and the voltage generator 150 to perform an operation corresponding to the received command CMD. That is, the control logic 140 may control an operation of the voltage generator 150 through a voltage generation control signal $CTRL_{VG}$. In addition, the control logic 140 may control an operation of the address decoder 120 through the address decoding control signal $CTRL_{AD}$. Meanwhile, the control logic 140 may control an operation of the page buffers PB1 to PBm in the read and write circuit 130 through the page buffer control signal $CTRL_{PB}$.

The voltage generator 150 generates the read voltage Vread and the pass voltage Vpass during the read operation in response to the voltage generation control signal $CTRL_{VG}$ output from the control logic 140. The voltage generator 150 may generate various operation voltages. For example, the voltage generator 150 may generate the program voltage and the program pass voltage used in the program operation. In addition, the voltage generator 150 may generate the verify voltage and the verify pass voltage used in the verify operation. As another example, the voltage generator 150 may generate an erase voltage and an erase pass voltage used in the erase operation.

Figure 3:
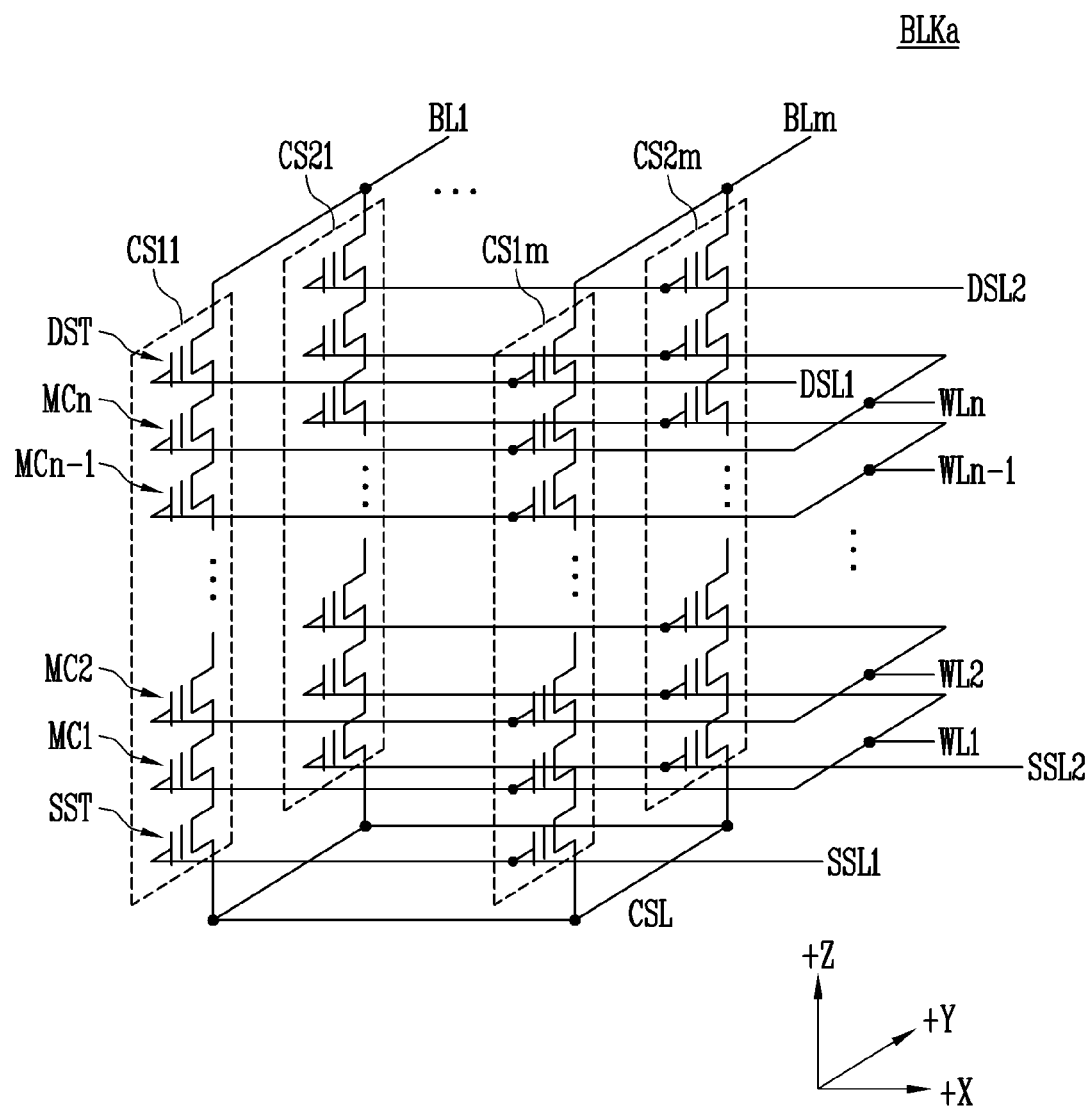
FIG. 3 is a circuit diagram illustrating any one memory block BLKa among memory blocks BLKa to BLKz of FIG. 2.

FIG. 3 is a circuit diagram illustrating any one memory block BLKa among the memory blocks BLKa to BLKz of FIG. 2.

Referring to FIG. 3, the memory block BLKa includes a plurality of cell strings CS11 to CS1m and CS21 to CS2m. In the memory block BLKa, m cell strings are arranged in a row direction (that is, a +X direction). In FIG. 3, two cell strings are arranged in a column direction (that is, a +Y direction). However, this is for convenience of description and it may be understood that three or more cell strings may be arranged in the column direction.

Each of the plurality of cell strings CS11 to CS1m and CS21 to CS2m includes at least one source select transistor SST, first to n-th memory cells MC1 to MCn, and at least one drain select transistor DST. The source select transistor SST of each cell string is connected between a common source line CSL and the memory cells MC1 to MCn.

As an embodiment, source select transistors of cell strings arranged in the same row are connected to a source select line extending in the row direction, and source select transistors of cell strings arranged in different rows are connected to different source select lines. In FIG. 3, the source select transistors of the cell strings CS11 to CS1m of a first row are connected to a first source select line SSL1. The source select transistors of the cell strings CS21 to CS2m of a second row are connected to a second source select line SSL2.

As another embodiment, the source select transistors of the cell strings CS11 to CS1m and CS21 to CS2m may be commonly connected to one source select line.

The first to n-th memory cells MC1 to MCn of each cell string are connected between the source select transistor SST and the drain select transistor DST. Gates of the first to n-th memory cells MC1 to MCn of each cell string are connected to the first to n-th word lines WL1 to WLn, respectively.

The drain select transistor DST of each cell string is connected between a corresponding bit line and the memory cells MC1 to MCn. The drain select transistors of cell string arranged in the row direction are connected to a drain select line extending in the row direction. The drain select transistors of the cell strings CS11 to CS1m of the first row are connected to a first drain select line DSL1. The drain select transistors of the cell strings CS21 to CS2m of the second row are connected to a second drain select line DSL2.

The cell strings arranged in the column direction are connected to the bit lines extending in the column direction. In FIG. 3, the cell strings CS11 and CS21 of the first column are connected to the first bit line BL1. The cell strings CS1m and CS2m of the m-th column are connected to the m-th bit line BLm.

The memory cells connected to the same word line in the cell strings arranged in the row direction configure one page. For example, the memory cells connected to the first word line WL1 among the cell strings CS11 to CS1m of the first row configure one page. The memory cells connected to the first word line WL1 among the cell strings CS21 to CS2m of the second row configure another page. The cell strings arranged in one row direction may be selected by selecting any one of the drain select lines DSL1 and DSL2. One page of the selected cell strings may be selected by selecting any one of the word lines WL1 to WLn.

In FIG. 3, the memory block BLKa may include two string groups. In the present specification, a string group may be defined as cell strings sharing the drain select line or the source select line. Therefore, in an example of FIG. 3, two pages may be connected to each word line.

More specifically, the memory block BLKa of FIG. 3 includes two string groups disposed in the +Y direction. Each of the string groups includes cell strings arranged in the +X direction. That is, a first string group includes the cell strings CS11 to CS1m of the first row, and a second string group includes the cell strings CS21 to CS2m of the second row. As shown in FIG. 3, the cell strings CS11 to CS1m included in the first string group are commonly connected to the first drain select line DSL1 and the first source select line SSL1. Meanwhile, the cell strings CS21 to CS2m included in the second string group are commonly connected to the second drain select line DSL2 and the second source select line SSL2.

Although the memory block shown in FIG. 3 includes two string groups, the memory block may be configured to include four string groups. Hereinafter, for convenience of discussion, the present disclosure is described based on an embodiment in which each memory block of the semiconductor memory device includes two string groups.

Figure 4:
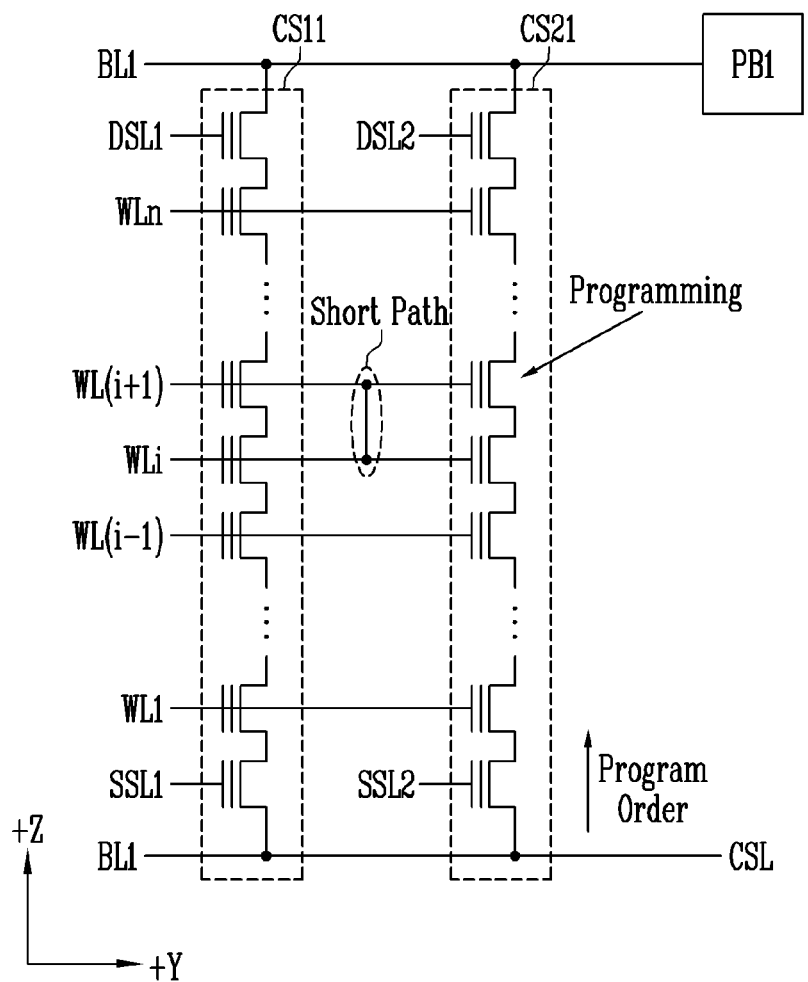
FIG. 4 is a circuit diagram illustrating cell strings connected to a first bit line BL1 among cell strings included in the memory block BLKa of FIG. 3.

FIG. 4 is a circuit diagram illustrating cell strings connected to the first bit line BL1 among the cell strings included in the memory block BLKa of FIG. 3.

Referring to FIG. 4, the cell string CS11 connected to the first bit line BL1 among the cell strings CS11 to CS1m of the first row and the cell string CS21 connected to the second bit line BL2 among the cell string CS21 to CS2m of the second row are shown.

Referring to FIG. 4, the program operation is performed in a direction from a page adjacent to the source select lines SSL1 and SSL2 to a page adjacent to the drain select lines DSL1 and DSL2.

Among two pages connected to the first word line WL1, the program operation on the page included in the cell strings CS11 to CS1m of the first row may be performed, and then the program operation on the page included in the cell strings CS21 to CS2m of the second row may be performed. Next, among two pages connected to the second word line WL2, the program operation on the page included in the cell strings CS11 to CS1m of the first row may be performed, and then the program operation on the page included in the cell strings CS21 to CS2m of the second row may be performed. In such a method, a sequential program operation may be performed in a direction in which a word line number increases.

During the sequential program operation of the memory block BLKa, a short defect between the word lines may occur. In FIG. 4, a situation in which a short path occurs between an i-th word line WLi and an (i+1)-th word line WL(i+1) during a program operation of a page connected to the (i+1)-th word line WL(i+1) is shown. More specifically, it is assumed that a short path occurs between the i-th word line WLi and the (i+1)-th word line WL(i+1) during the program operation on the page included in the cell strings CS21 to CS2m of the second row among two pages connected to the (i+1)-th word line WL(i+1). At this time, data programmed to pages connected to the i-th word line WLi is required to be recovered. Hereinafter, the present disclosure is described with reference to FIGS. 5 and 6.

Figure 5:
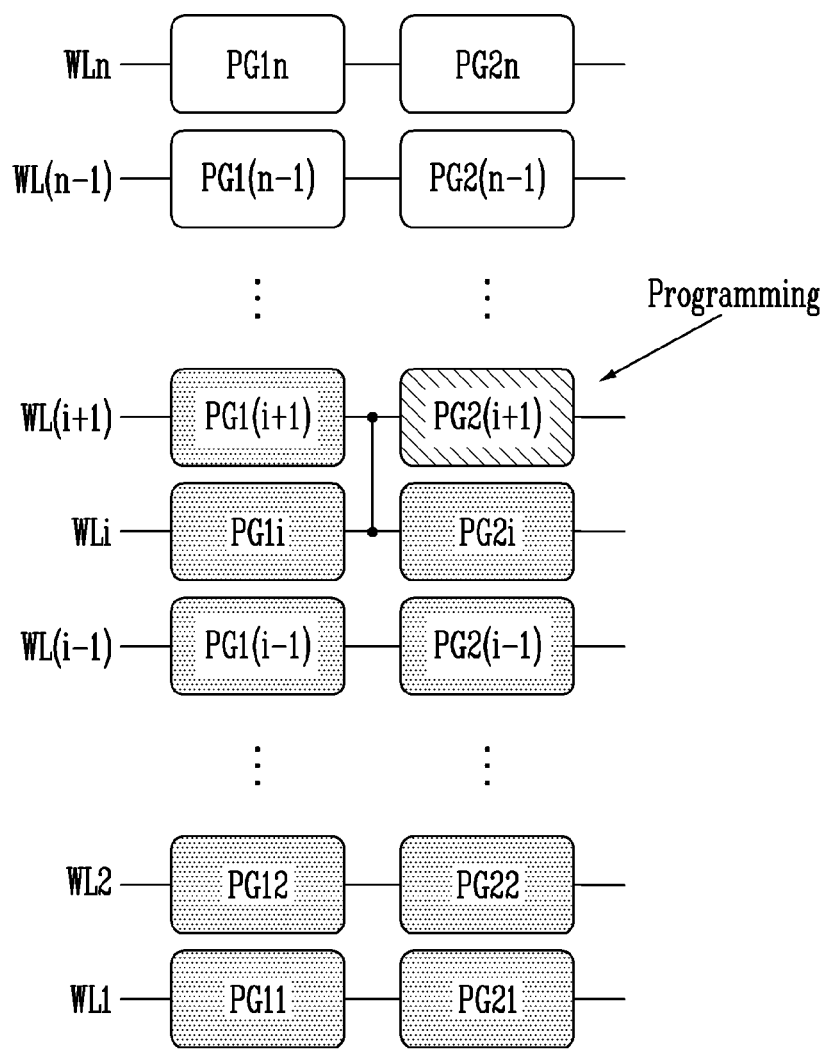
FIG. 5 is a diagram illustrating a program operation on pages included in the memory block BLKa of FIG. 2.

FIG. 5 is a diagram illustrating the program operation on the pages included in the memory block BLKa of FIG. 2. FIG. 6 is a table illustrating data maintained in the buffer memory of the controller according to a program progression situation of FIG. 5. Hereinafter, the present disclosure is described with reference to FIGS. 5 and 6 together.

FIG. 5 is a diagram illustrating the memory block shown in FIG. 3 from a viewpoint of the page. As described above, in the memory block BLKa shown in FIG. 3, two pages are connected to each of the word lines WL1 to WLn. For example, pages PG11 and PG21 are connected to the first word line WL1, and pages PG12 and PG22 are connected to the second word line WL2.

As described above with reference to FIG. 4, a sequential program operation may be performed in a direction from the first word line WL1 to the n-th word line WLn, that is, in a direction in which a word line number increases. Referring to FIG. 5, a page on which the program operation is completed is shown by a dot shade. That is, FIG. 5 shows a state in which a program operation on pages PG11 to PG1$i$ and PG21 to PG2$i$ connected to the first to i-th word lines WL1 to WLi is completed. In addition, among pages PG1($i$+1) and PG2($i$+1) connected to the (i+1)-th word line WL(i+1), a program operation on the page PG1($i$+1) included in the cell strings CS11 to CS1$m$ of the first row is completed.

Meanwhile, in FIG. 5, a page on which the program operation is being performed is hatched. That is, a situation, in which the program operation is currently being performed on the page PG2($i$+1) included in the cell strings CS21 to CS2$m$ of the second row among the pages PG1($i$+1) and PG2($i$+1) connected to the (i+1)-th word line WL(i+1), is shown. In addition, a page on which the program operation is not yet performed is shown in white.

As described above with reference to FIG. 4, a short defect between the word lines may occur during a sequential program operation on the memory block BLKa. That is, during the program operation on the second page PG2($i$+1) among the pages connected to the (i+1)-th word line WL(i+1), a short path may occur between the i-th word line WLi and the (i+1)-th word line WL(i+1). In this case, the memory block BLKa is processed as a defect, but data previously programmed to the memory block BLKa is required to be programmed to another memory block.

FIG. 6 shows data maintained in the buffer memory of the controller 200. Data D11 to D1n and D21 to D2n shown in FIG. 6 correspond to the pages PG11 to PG1$n$ and PG21 and PG2$n$ included in the memory block BLKa, respectively. That is, the data D11 and D21 are stored in the pages PG11 and PG21 connected to the first word line WL1, respectively, and the data D12 and D22 are stored in the pages PG12 and PG22 connected to the second word line WL2, respectively.

When program of data of pages connected to a specific word line is normally completed, the controller 200 may delete data of corresponding pages from the buffer memory. This is because the buffer memory included in the controller 200 has a limited capacity. As described above with reference to FIG. 5, the program operation on the pages PG11 to PG1$i$ and PG21 to PG2$i$ connected to the first to i-th word lines WL1 to WLi has completed. Therefore, data D11 to D1$i$ and D21 to D2$i$ corresponding to the pages PG11 to PG1$i$ and PG21 to PG2$i$ connected to the first to i-th word lines WL1 to WLi may be deleted from the buffer memory. In FIG. 6, the deleted data is hatched.

Although the program operation on the first page PG1($i$+1) connected to the (i+1)-th word line WL(i+1) is completed, since the program operation on the second page PG2($i$+1) connected to the (i+1)-th word line (WL(i+1)) is not completed, the controller 200 may maintain both of data D1($i$+1) and data D2($i$+1) in the buffer memory. When the program operation on the second page PG2($i$+1) connected to the (i+1)-th word line WL(i+1) is completed, the controller 200 may delete the data D1($i$+1) and the data D2($i$+1) from the buffer memory.

As described above with reference to FIGS. 4 and 5, when a short path occurs between the i-th word line WLi and the (i+1)-th word line WL(i+1) during the program operation of the second page PG2($i$+1) connected to the (i+1)-th word line WL(i+1), the program operation of the page PG2($i$+1) might not be normally completed. At this time, the semiconductor memory device 100 may transmit a message indicating that the program operation of the page PG2($i$+1) is failed to the controller 200. The controller 200 may process the memory block BLKa as a defect based on the message indicating that the program operation is failed. However, before processing the defect of the memory block BLKa, the data programmed to the memory block BLKa is required to be programed to another memory block.

At this time, data D11 to D1($i$−1) and D21 to D2($i$−1) may be obtained by performing a read operation on pages PG11 to PG1($i$−1) and PG21 to PG2($i$−1) connected to first to (i−1)-th word lines WL1 to WL(i−1). In addition, data D1($i$+1) to D$in$ and D2($i$+1), and D2$n$ corresponding to pages PG1($i$+1) to PG1$n$, PG2($i$+1), and PG2$n$ connected to the (i+1)-th to n-th word lines WL(i+1) to WLn still remain in the buffer memory of the controller 200. Accordingly, the data D1$i$ and D2$i$ stored in the pages PG1$i$ and PG2$i$ connected to the i-th word line WLi is required to be recovered.

In order to recover the data D1$i$ and D2$i$ stored in the pages PG1$i$ and PG2$i$ connected to the i-th word line WLi, a read operation on each of corresponding pages PG1$i$ and PG2$i$ is required to be performed. At this time, when the read voltage Vread is applied to the i-th word line WLi and the pass voltage Vpass is applied to the (i+1)-th word line WL(i+1), a normal voltage application might not be possible due to the short path between the i-th word line WLi and the (i+1)-th word line WL(i+1). That is, in order to read the data D1$i$ and D2$i$ stored in the pages PG1$i$ and PG2$i$ connected to the i-th word line WLi, the read voltage Vread is required to be equally applied to the i-th word line WLi and the (i+1)-th word line WL(i+1).

However, since program of the data D1($i$+1) to the first page PG1($i$+1) connected to the (i+1)-th word line WL(i+1) is already completed and the data D2($i$+1) is being programmed to the second page PG2($i$+1) connected to the (i+1)-th word line WL(i+1), a threshold voltage of some of the memory cells connected to the (i+1)-th word line WL(i+1) might not correspond to an erase state. Accordingly, when the read operation is performed by applying the read voltage Vread equally to the i-th word line WLi and the (i+1)-th word line WL(i+1), the data of the memory cells connected to the i-th word line WLi might not be normally read due to an influence of the threshold voltage of the memory cells connected to the (i+1)-th word line WL(i+1).

In accordance with the semiconductor memory device 100 and the controller 200 according to an embodiment of the present disclosure, when a program failure occurs during the program operation of the page PG1($i$+1) or PG2($i$+1) connected to the (i+1)-th word line WL(i+1), the pages PG1($i$+1) and PG2($i$+1) connected to the (i+1)-th word line WL(i+1) are partially erased. Thereafter, the data of the memory cells connected to the i-th word line WLi may be normally read by performing the read operation by applying the read voltage Vread to the i-th word line WLi and the (i+1)-th word line WL(i+1).

Figure 7:
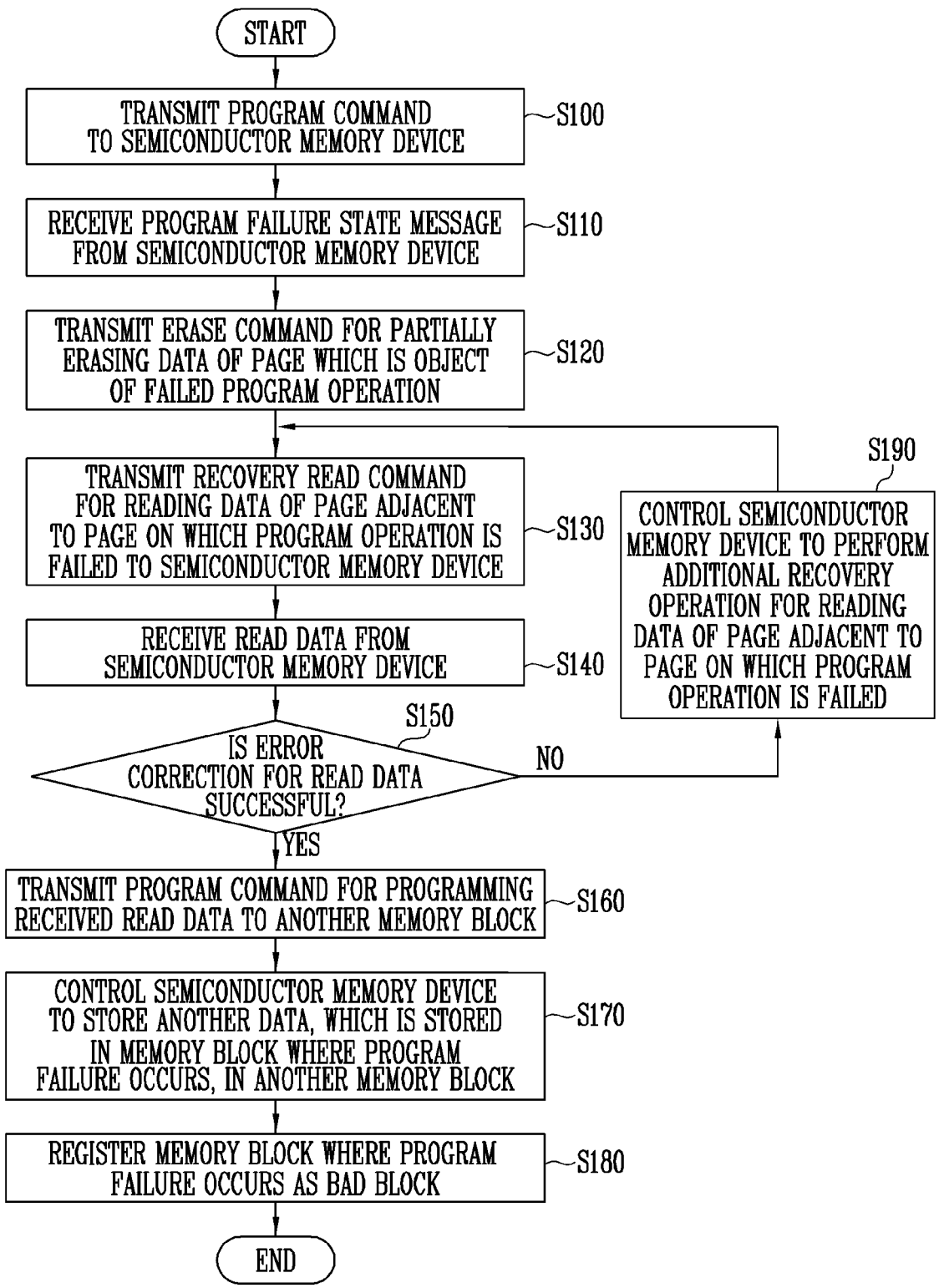
FIG. 7 is a flowchart illustrating a method of operating a controller according to an embodiment of the present disclosure.

FIG. 7 is a flowchart illustrating a method of operating a controller according to an embodiment of the present disclosure.

According to FIG. 7, the method of operating the controller 200 according to an embodiment of the present disclosure includes transmitting a program command to the semiconductor memory device 100 (S100), receiving a program failure state message from the semiconductor memory device 100 (S110), transmitting an erase command for partially erasing data of a page that is an object of a failed program operation to the semiconductor memory device 100 (S120), and transmitting a recovery read command for reading data of a page adjacent to the page on which the program operation is failed to the semiconductor memory device 100 (S130).

In an embodiment, after step S130, the method of operating the controller 200 may further include receiving read data from the semiconductor memory device 100 (S140) and determining whether error correction for the read data is successful (S150). In addition, the method of operating the controller 200 may further include controlling the semiconductor memory device 100 to perform an additional recovery operation for reading the data of the page adjacent to the page on which the program operation is failed (S190), when the error correction for the received read data is failed (S150: No).

Meanwhile, the method of operating the controller 200 according to an embodiment of the present disclosure may further include transmitting a program command for programming the received read data to another memory block to the semiconductor memory device (S160) when the error correction for the received read data is successful (S150: YES), controlling the semiconductor memory device to store another data, which is stored in the memory block where the program failure occurs, in another memory block (S170), and registering the memory block where the program failure occurs as a bad block (S180). Hereinafter, each step is described in more detail. In an embodiment, the another memory block may be a memory block where the program failure did not occur.

In step S100, the controller 200 may transmit the program command to the semiconductor memory device 100 together with data to be programmed. The semiconductor memory device 100 may program the received data in response to the received program command.

During program of the data, the short path may occur between the i-th word line WLi and the (i+1)-th word line WL(i+1), as described with reference to FIGS. 4 and 5. In this case, the semiconductor memory device 100 might not normally complete a program operation on the received data. Therefore, the semiconductor memory device 100 may transmit the state message indicating the program failure to the controller 200. Accordingly, the controller 200 receives the program failure state message from the semiconductor memory device 100 (S110).

As the program failure state message for the page connected to the (i+1)-th word line WL(i+1) is received, the controller 200 may determine to store the data D11 to D1$i$ and D21 to D2$i$ programmed to the pages PG11 to PG1$i$ and PG21 to PG2$i$ connected to the first to i-th word lines WL1 to WLi in another memory block. As described above, the data D11 to D1($i$−1) and D21 to D2($i$−1) programmed to the pages PG11 to PG1 ($i$−1) and PG21 to PG2 ($i$−1) connected to the first to ($i$−1)-th word lines WL1 to WL($i$−1) may be obtained by performing a normal read operation on the pages PG11 to PG1($i$−1) and PG21 to PG2($i$−1). However, when the short path occurs between the i-th word line WLi and the (i+1)-th word line WL(i+1), the data D1$i$ and D2$i$ programmed to the pages PG1$i$ and PG2$i$ connected to the i-th word line WLi might not be obtained through the normal read operation.

In this case, the controller 200 may control the semiconductor memory device 100 to first partially erase the pages PG1($i$+1) and PG2($i$+1) connected to the (i+1)-th word line WL(i+1). Specifically, the controller 200 may transmit an erase command for partially erasing the pages PG1($i$+1) and PG2($i$+1) connected to the (i+1)-th word line WL(i+1) to the semiconductor memory device 100 (S120). In response to the received erase command, the semiconductor memory device 100 may perform a partial erase operation on the pages PG1($i$+1) and PG2($i$+1) connected to the (i+1)-th word line WL(i+1). During a normal erase operation, all data stored in the memory block may be collectively deleted, but in the partial erase operation, some of the data stored in the memory block may be deleted. By the partial erase operation on the pages PG1($i$+1) and PG2($i$+1) connected to the (i+1)-th word line WL(i+1), a threshold voltage of all memory cells connected to the (i+1)-th word line WL(i+1) is changed to an erase state.

Thereafter, the controller 200 transmits a recovery read command for reading the data D2$i$ of the page PG2$i$ adjacent to the page PG2($i$+1) on which the program operation is failed to the semiconductor memory device 100 (S130). According to an embodiment, in step S130, the controller 200 may transmit a recovery read command for reading the data D1$i$ of the page PG1$i$ as well as the page PG2$i$ to the semiconductor memory device 100.

The semiconductor memory device 100 may read data of the page PG2$i$ based on the received recovery read command. At this time, the semiconductor memory device 100 receiving the recovery read command may apply the read voltage Vread to both of the i-th word line WLi connected to the page PG2$i$ and the (i+1)-th word line WLi connected to the page PG2($i$+1) where the program failure occurs. Since the semiconductor memory device 100 performs the partial erase operation on the pages PG1($i$+1) and PG2($i$+1) connected to the (i+1)-th word line WL(i+1) by step S120, the memory cells connected to the (i+1)-th word line WL(i+1) might not affect a read operation of the page PG2$i$ connected to the i-th word line WLi. Accordingly, the semiconductor memory device 100 may read the data D2$i$ of the page PG2$i$ connected to the i-th word line WLi and transmit the data D2$i$ to the controller 200 as read data. Accordingly, the controller 200 receives the read data (S140).

Meanwhile, as described above, in step S130, the controller 200 may transmit a recovery read command for reading the data D1$i$ of the page PG1$i$ to the semiconductor memory device 100. In this case, the semiconductor memory device 100 may perform the read operation by applying the read voltage Vread to both of the i-th word line WLi and the (i+1)-th word line WL(i+1). The data D1$i$ of the page PG1$i$ may be transmitted to the controller 200 as the read data by the read operation.

Thereafter, the controller 200 may perform an error correction operation on the received read data. In a case where the error correction operation is successful (S150: Yes), the case may mean that the data D1$i$ and D2$i$ of the pages PG1$i$ and PG2$i$ connected to the i-th word line WLi are successfully read. Therefore, in this case, the controller 200 may transmit a command for programming the received read data to another memory block to the semiconductor memory device 100 (S160).

In response to the received program command, the semiconductor memory device 100 may program the data D1i and D2i to the other memory block.

Additionally, the controller 200 may control the semiconductor memory device 100 to store the other data D11 to D1(i−1) and D21 to D2(i−1), which are stored in the memory block BLKa, in another memory block other than the memory block BLKa, in addition to the data D1i and D2i (S170). In step S170, the controller 200 may transmit read commands for reading the data D11 to D1(i−1) and D21 to D2(i−1) and program commands for programming the read data to another memory block to the semiconductor memory device 100. The data D11 to D1i and D21 to D2i shown in FIG. 6 may be programmed to another memory block by steps S160 and S170. Additionally, the controller 200 may control the semiconductor memory device 100 to store the data D1(i+1) to Din and D2(i+1) to D2n which are still maintained in the buffer memory in another memory block.

Thereafter, the controller 200 may register the memory block BLKa where the program failure occurs as the bad block (S180). Accordingly, the memory block BLKa registered as the bad block might not be used again later.

On the other hand, in a case where the error correction operation on the read data received by step S140 is failed (S150: No), the case may mean that the data D1i and D2i of the pages PG1i and PG2i connected to the i-th word line WLi might not be normally read. Therefore, in this case, the controller 200 may control the semiconductor memory device 100 to read the data D1i and D2i of the pages PG1i and PG2i connected to the i-th word line WLi again. Specifically, the controller 200 may control the semiconductor memory device to perform an additional recovery operation for reading the data D1i and D2i of the pages PG1i and PG2i connected to the i-th word line WLi (S190). Specific embodiments of step S190 are described later with reference to FIGS. 11 and 12. After performing step S190, the controller transmits the recovery read command for reading the data of the page adjacent to the page on which the program operation is failed to the semiconductor memory device 100 again (S130).

Figure 8:
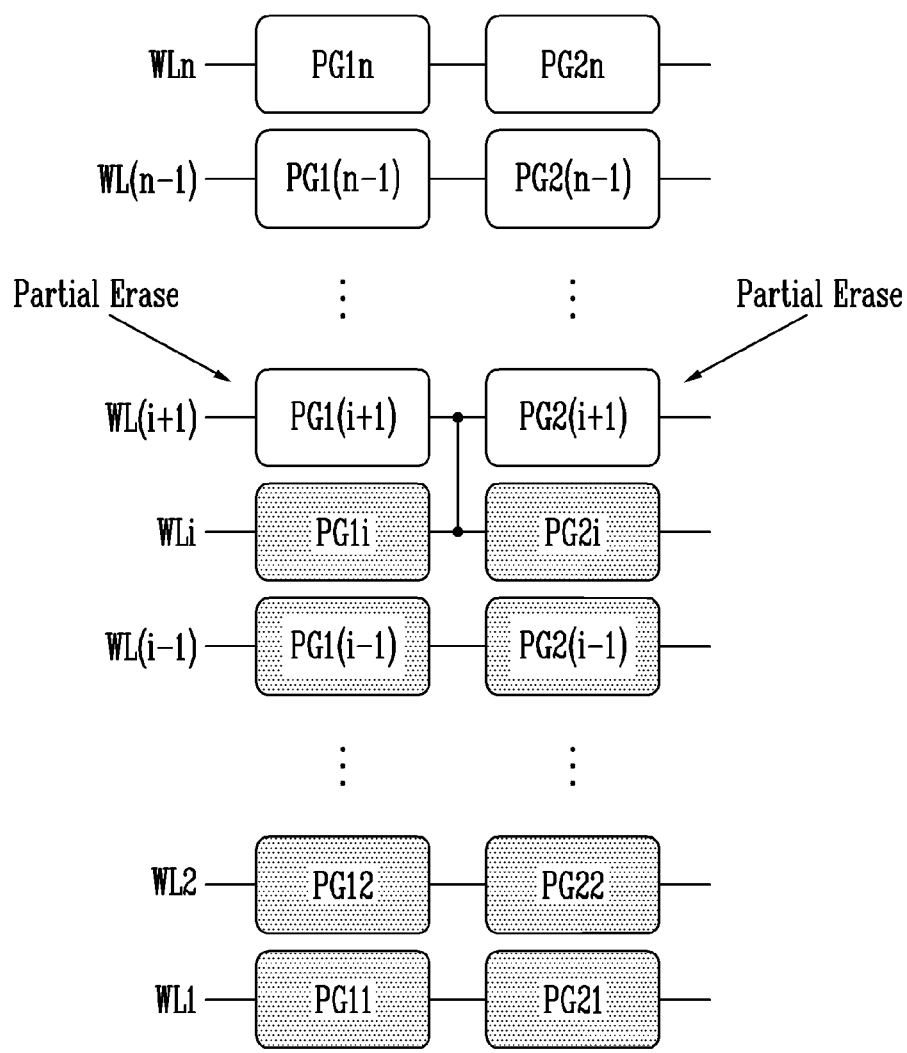
FIG. 8 is a diagram illustrating a semiconductor memory device performing a partial erase operation.

FIG. 8 is a diagram illustrating a semiconductor memory device performing the partial erase operation. Specifically, FIG. 8 is a diagram illustrating an operation of the semiconductor memory device receiving the erase command according to step S120 of FIG. 7.

In response to the received erase command, the semiconductor memory device 100 may perform partial erase operation on the pages PG1(i+1) and PG2(i+1) connected to the (i+1)-th word line WL(i+1). Accordingly, not only the page PG1(i+1) where program is already completed but also the page PG2(i+1) where program is being operated when the short path occurs are erased. Therefore, a threshold voltage of memory cells included in the pages PG1(i+1) and PG2(i+1) is changed to the erase state.

In an embodiment, for the partial erase operation on the pages PG1(i+1) and PG2(i+1), the erase voltage may be applied to the (i+1)-th word line WL(i+1) and the erase pass voltage may be applied to the remaining word lines WL1 to WLi and WL(i+2) to WLn. In another embodiment, for the partial erase operation on the pages PG1(i+1) and PG2(i+1), the erase voltage may be applied to the (i+1)-th to n-th word lines WL(i+1) to WLn and the erase pass voltage may be applied to the remaining word lines WL1 to WLi.

Figure 9:
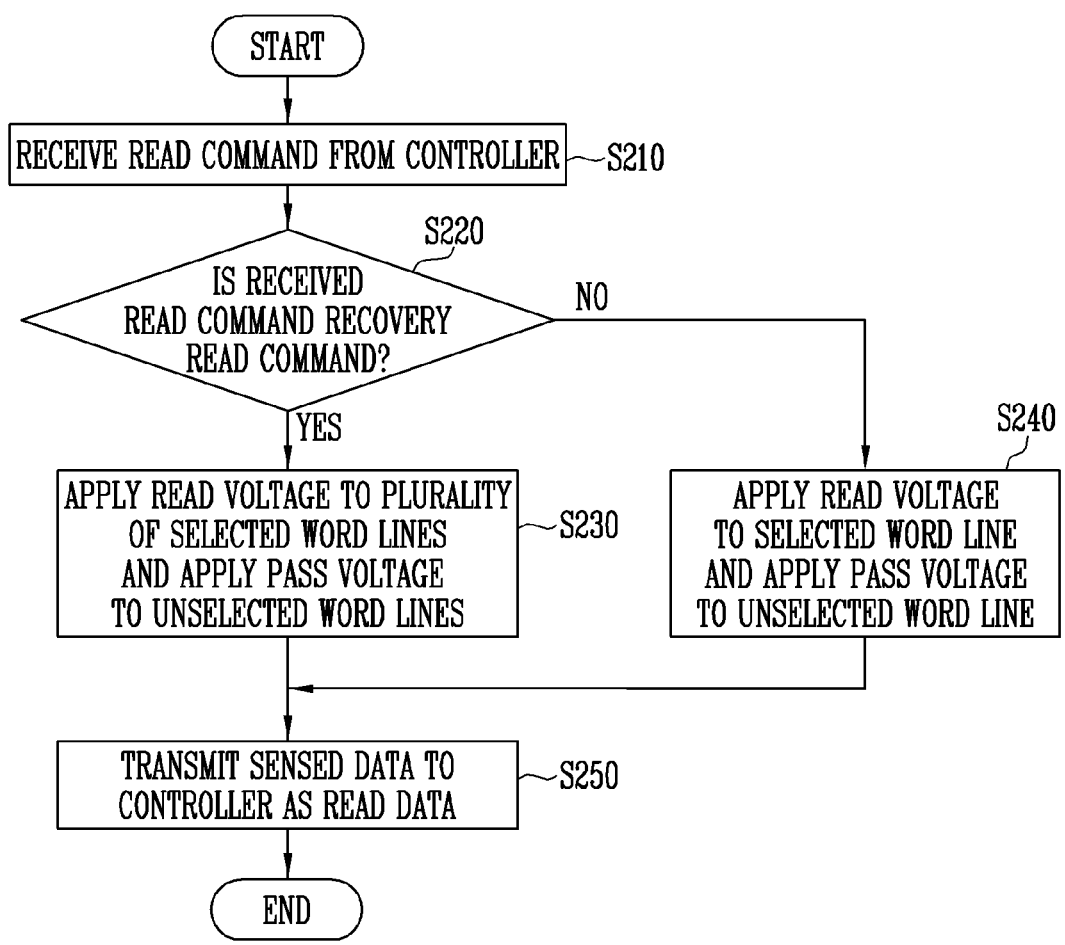
FIG. 9 is a flowchart illustrating a method of operating a semiconductor memory device according to an embodiment of the present disclosure.

FIG. 9 is a flowchart illustrating a method of operating a semiconductor memory device according to an embodiment of the present disclosure.

Referring to FIG. 9, the method of operating the semiconductor memory device 100 according to an embodiment of the present disclosure includes receiving a read command from the controller 200 (S210), determining whether the received read command is a recovery read command (S220), applying the read voltage Vread to a plurality of word lines selected by the recovery read command and applying the pass voltage to unselected word lines (S230) when the received read command is the recovery read command (S220: Yes), and transmitting sensed data to the controller 200 as read data (S250). Meanwhile, the method of operating the semiconductor memory device 100 according to an embodiment of the present disclosure may further include applying the read voltage Vread to a word line selected by a normal read command and applying the pass voltages to unselected word lines (S240) when the received read command is not the recovery read command (S220: No). Hereinafter, each of steps is more specifically described.

In step S210, the semiconductor memory device 100 may receive the read command from the controller 200. The read command received from the controller 200 may be the normal read command or the recovery read command.

The normal read command may be a read command for a normal read operation, and may include a row address for one selected word line. The semiconductor memory device 100 receiving the normal read command may perform the read operation in a method of applying the read voltage to one word line specified by the row address and applying the pass voltage to the remaining unselected word lines.

On the other hand, the recovery read command may be a read command for recovering data according to word line short occurrence. To this end, the recovery read command may include row addresses specifying two word lines where a short occurs. For example, according to an example shown in FIGS. 4 and 5, the recovery read command may include two row addresses specifying the i-th word line WLi and the (i+1)-th word line WL(i+1), respectively. When receiving the recovery read command from the controller 200, the semiconductor memory device may perform the read operation (i.e., recovery read operation) in a method of applying the read voltage to two word lines specified by the recovery read command and applying the pass voltage to the remaining unselected word lines.

Therefore, when receiving the read command from the controller 200 (S210), the semiconductor memory device 100 determines whether the received read command is the recovery read command or the normal read command (S220). When the received read command is the recovery read command (S220: Yes), the semiconductor memory device 100 may apply the read voltage to the two word lines selected by the recovery read command and apply the pass voltage to the remaining unselected word lines (S230). On the other hand, when the received read command is the normal read command (S220: No), the semiconductor memory device 100 may apply the read voltage to one word line selected by the normal read command and apply the pass voltage to the remaining unselected word lines (S240).

A threshold voltage sensing operation of the memory cell is performed in a state in which the read voltage or the pass voltage is applied to the word lines, and the semiconductor memory device 100 transmits the sensed data to the controller 200 as the read data (S250).

Figure 10A:
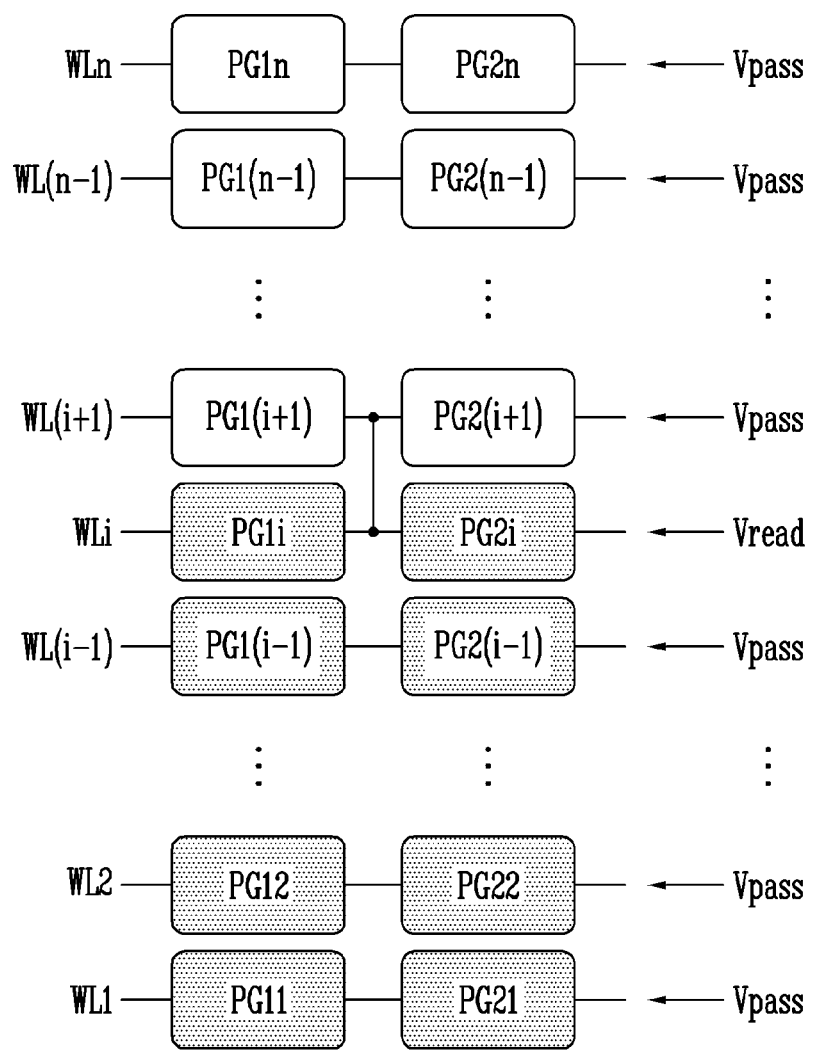
FIG. 10A is a diagram illustrating a read operation of the semiconductor memory device when a normal read command is received.
Figure 10B:
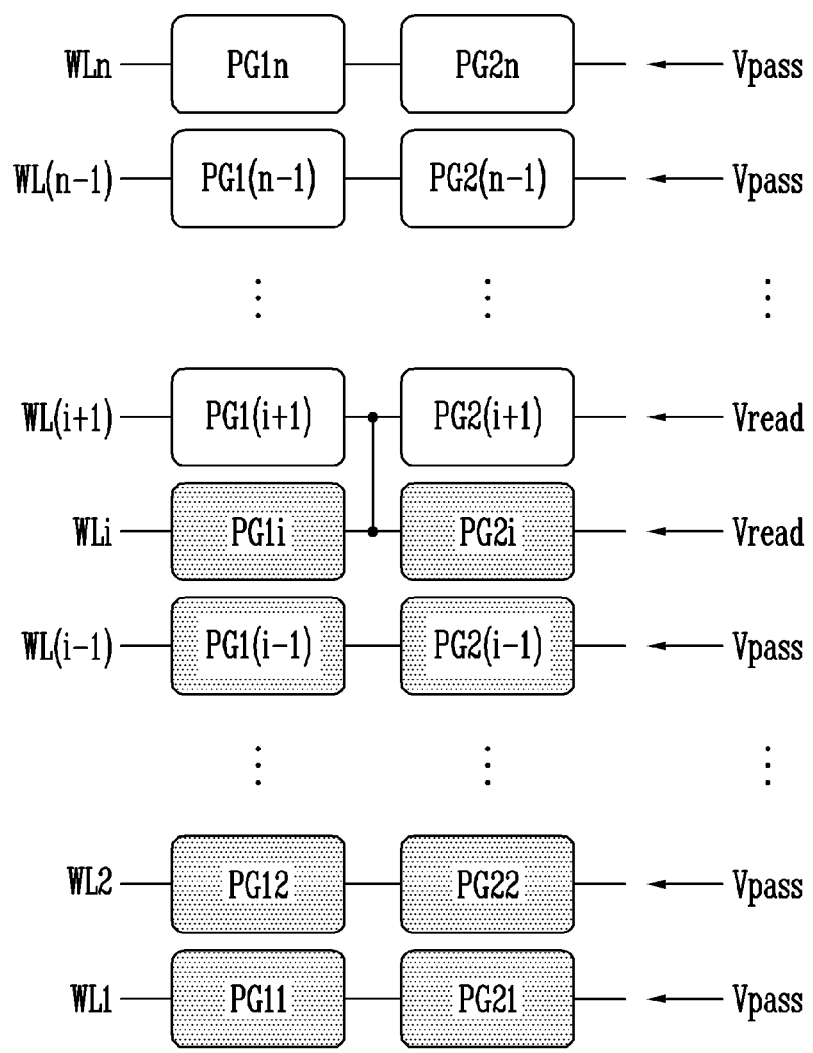
FIG. 10B is a diagram illustrating the read operation of the semiconductor memory device when a recovery read command is received.

FIG. 10A is a diagram illustrating the read operation of the semiconductor memory device when the normal read command is received, and FIG. 10B is a diagram illustrating the read operation of the semiconductor memory device when the recovery read command is received.

Referring to FIG. 10A, the normal read operation performed by step S240 of FIG. 9 is shown. As described above, when the read command received by the semiconductor memory device 100 is the normal read command (S220: No), the semiconductor memory device 100 performs the read operation in a method of applying the read voltage Vread to one word line WLi selected by the normal read command and applying the pass voltage Vpass to the remaining unselected word lines WL1 to WL(i−1) and WL(i+1) to WLn.

When the short path occurs between the i-th word line WLi and the (i+1)-th word line WL(i+1), when the read voltage Vread is applied to the i-th word line WLi and the pass voltage Vpass is applied to the (i+1)-th word line WL(i+1), the read operation is not normally performed. Therefore, in order to prevent or mitigate a situation shown in FIG. 10A, when a program failure of the semiconductor memory device 100 occurs, the controller 200 may transmit the recovery read command to the semiconductor memory device 100.

Referring to FIG. 10B, a recovery read operation performed by step S230 of FIG. 9 is shown. As described above, when the read command received by the semiconductor memory device 100 is the recovery read command (S220: Yes), the semiconductor memory device 100 performs the read operation in a method of applying the read voltage Vread to the two word lines WLi and WL(i+1) selected by the recovery read command and applying the pass voltage Vpass to the remaining unselected word lines WL1 to WL(i−1) and WL(i+2) to WLn.

A partial erase operation on the pages PG1(i+1) and PG2(i+1) connected to the (i+1)-th word line WL(i+1) is completed by step S120 of FIG. 7. Therefore, when the read operation is performed in the method of applying the read voltage to the i-th and (i+1)-th word lines WLi and WL(i+1), the data D1i and D2i of the pages PG1i and PG2i connected to the i-th word line WLi may be read. Accordingly, the read data may be transmitted from the semiconductor memory device 100 to the controller 200 (S140 of FIG. 7).

Figure 11:
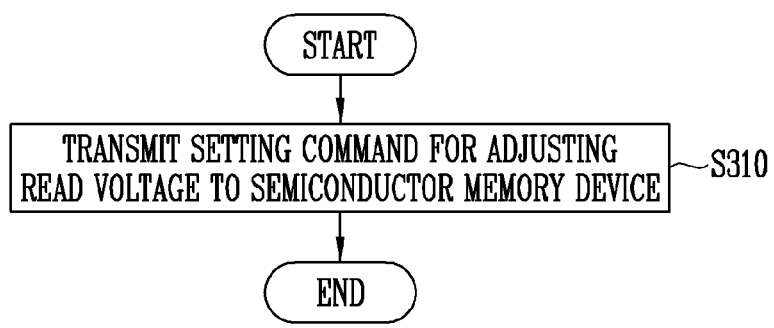
FIG. 11 is a flowchart illustrating an embodiment of step S190 of FIG. 7.

FIG. 11 is a flowchart illustrating an embodiment of step S190 of FIG. 7.

As described above, in a case where the error correction operation on the read data received by step S140 of FIG. 7 is failed (S150: No), the case may mean that the data D1i and D2i of the pages PG1i and PG2i connected to the i-th word line WLi might not be normally read. Therefore, in this case, the controller 200 may control the semiconductor memory device to perform an additional recovery operation for reading the data D1i and D2i of the pages PG1i and PG2i connected to the i-th word line WLi (S190).

Referring to FIG. 11, step S190 of FIG. 7 may include transmitting a setting command for adjusting the read voltage to the semiconductor memory device 100 (S310). The semiconductor memory device 100 may adjust the read voltage Vread according to the received setting command. Thereafter, the controller 200 may transmit the recovery read command for reading the data of the page adjacent to the page on which the program operation is failed to the semiconductor memory device 100 again (S130). Therefore, the semiconductor memory device 100 may perform the read operation again in a method of applying the adjusted read voltage Vread to the i-th and (i+1)-th word lines WLi and WL(i+1).

A magnitude of the read voltage adjusted in step S310 may be determined in various methods. As an example, the controller 200 may repeatedly adjust the magnitude of the read voltage by referring to a pre-stored read retry table. As another example, the controller 200 may determine the magnitude of the read voltage adjusted in a method of finding a valley in a threshold voltage distribution of the memory cells included in the page PG1i or PG2i. Since various methods of adjusting the read voltage to reduce an error rate of the read data are well known in the art to which the present disclosure pertains, an additional description thereof is omitted.

Figure 12:
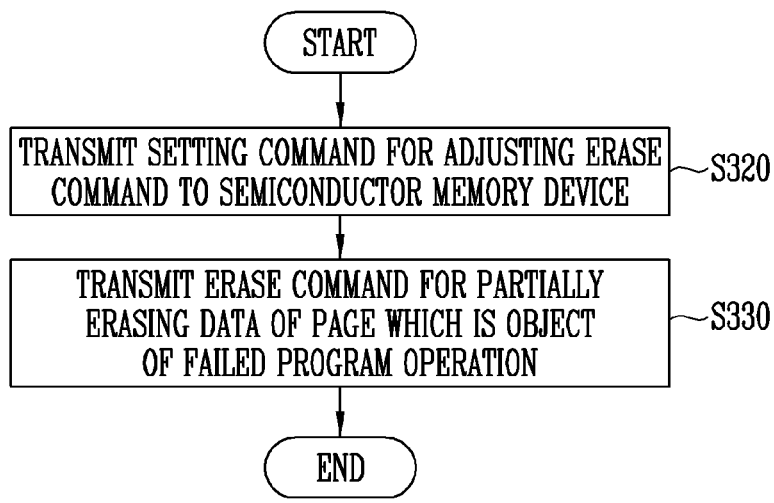
FIG. 12 is a flowchart illustrating another embodiment of step S190 of FIG. 7.

FIG. 12 is a flowchart illustrating another embodiment of step S190 of FIG. 7.

According to the embodiment shown in FIG. 11, step S190 of FIG. 7 may include an operation of adjusting the read voltage, but as shown in FIG. 12, step S190 may be performed in a method different from adjusting the read voltage.

Referring to FIG. 12, step S190 of FIG. 7 may include transmitting a setting command for adjusting an erase voltage to the semiconductor memory device 100 (S320) and transmitting an erase command for partially erasing data of a page that is an object of a failed program operation to the semiconductor memory device 100 (S330). In step S320, the semiconductor memory device 100 may adjust the erase voltage used for the partial erase operation. In this case, the erase voltage applied to the (i+1)-th word line WL(i+1) connected to the pages PG1(i+1) and PG2(i+1), which are objects of the partial erase operation, may be changed. Additionally, the erase pass voltage applied to the remaining word lines other than the (i+1)-th word line WL(i+1) may be changed.

Thereafter, in step S330, the semiconductor memory device 100 may perform the partial erase operation on the pages PG1(i+1) and PG2(i+1) connected to the (i+1)-th word line WL(i+1) again, using the adjusted erase voltage. Through this, in an embodiment, read accuracy in the read operation performed by the semiconductor memory device 100 in the subsequent step S130 may be further improved.

What is claimed is:

1. A method of operating a controller, the method comprising:
    transmitting a program command to a memory device;
    receiving a message indicating that a program operation for a page corresponding to the program command is failed from the memory device;
    transmitting an erase command for performing an erase operation on a portion of a memory block including the page corresponding to the program command to the memory device in response to the message, wherein the erase operation is performed to change a threshold voltage of each first memory cell, among a plurality of first memory cells, connected to a first word line corresponding to the page; and
    transmitting a recovery read command for reading data from a plurality of second memory cells connected to a second word line corresponding to the page.

2. The method of claim 1, wherein the recovery read command includes row addresses specifying the first word line and the second word line.

3. The method of claim 1, further comprising:
    receiving read data corresponding to the recovery read command; and
    performing an error correction operation on the read data.

4. The method of claim 3, further comprising:
controlling the memory device to perform an additional recovery operation for reading the data from the second memory cells connected to the second word line in response to determination that the error correction operation on the read data has failed.

5. The method of claim 4, wherein controlling the memory device to perform the additional recovery operation comprises transmitting a setting command for adjusting a read voltage to the memory device.

6. The method of claim 4, wherein controlling the memory device to perform the additional recovery operation comprises:
transmitting a setting command for adjusting an erase voltage to the memory device; and
re-transmitting an erase command for performing an erase operation on the first memory cells connected to the first word line corresponding to the page to the memory device.

7. The method of claim 4, further comprising:
re-transmitting the recovery read command for reading the data from the second memory cells connected the second word line to the memory device.

8. The method of claim 3, further comprising:
transmitting a program command for programming the read data to another memory block other than a memory block where a failure of the program operation occurs to the memory device, in response to determination that the error correction operation on the read data is successful.

9. The method of claim 8, further comprising:
controlling the memory device to store other data stored in the memory block where the failure of the program operation occurs in the other memory block.

10. The method of claim 8, further comprising:
registering the memory block where the failure of the program operation occurs as a bad block.

11. A method of operating a memory device, the method comprising:
receiving a read command from a controller;
performing a program operation corresponding to the program command;
transmitting a message indicating that the program operation for a page is failed to the controller, when it is determined that the program operation for the page corresponding to the program command is failed;
receiving an erase command for an erase operation for a portion of a memory block including the page from the controller;
changing a threshold voltage of each first memory cell, among the plurality of first memory cells, connected to the first word line corresponding to the page, to an erase state;
receiving a recovery read command from the controller;
performing a read operation for reading data from a plurality of second memory cells connected a second word line adjacent to the first word line, in response to the recovery read command.

12. The method of claim 11,
wherein the recovery read command includes row addresses specifying the first word line and the second word line.

13. The method of claim 11, wherein the performing a read operation for reading data from a second memory cells connected a second word line adjacent to the first word line comprises:
applying a read voltage to the first word line and the second word line; and
applying a pass voltage to remaining word lines except for the first word line and the second word line.

14. The method of claim 13, further comprising:
transmitting sensed data to the controller as read data in a state in which the read voltage is applied to the first word line and the second word line, and the pass voltage is applied to the remaining word lines except for the first word line and the second word line.

* * * * *